D. E. LEWELLEN.
VARIABLE SPEED TRANSMISSION.
APPLICATION FILED MAR. 18, 1920.
1,377,593.   Patented May 10, 1921.
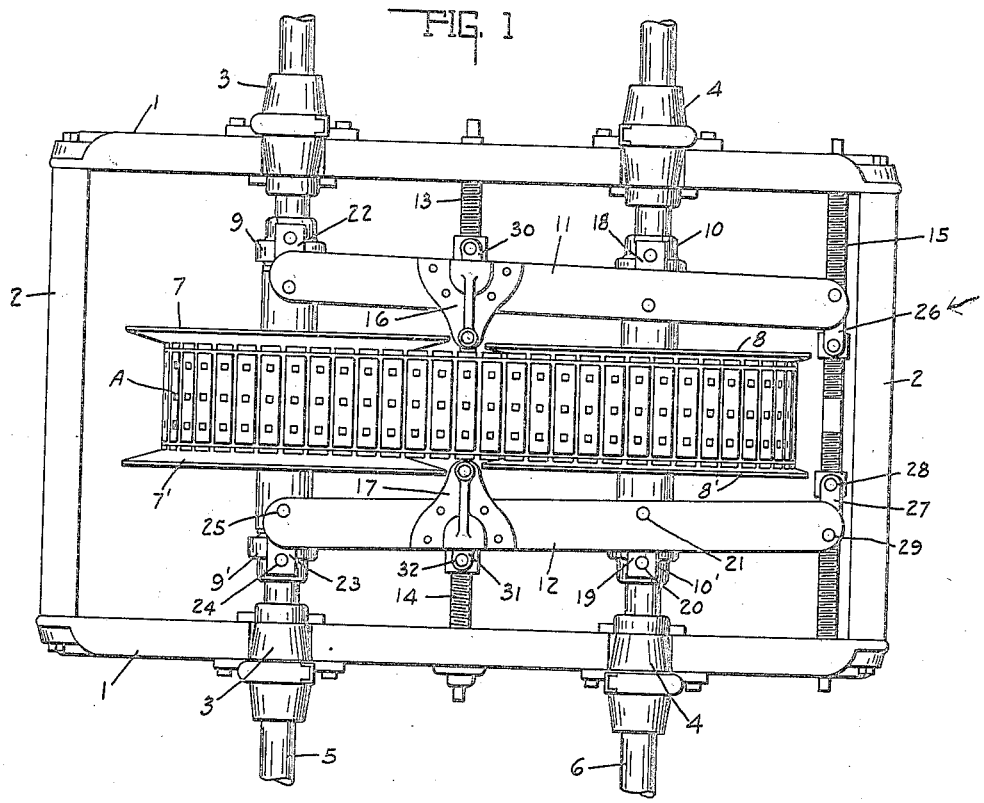
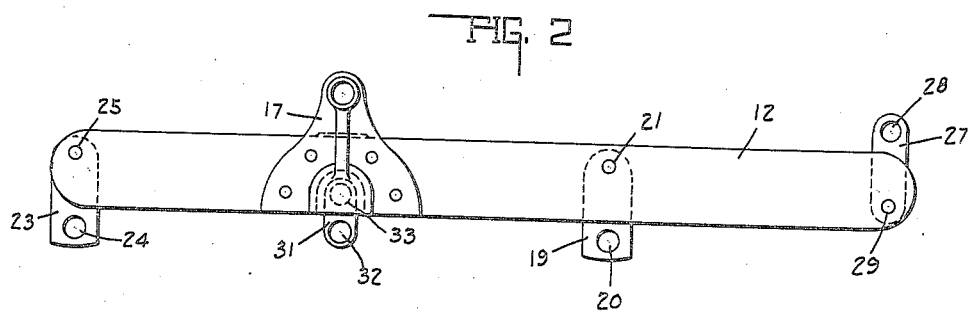
INVENTOR.
Darcy E. Lewellen
BY
ATTORNEYS.

UNITED STATES PATENT OFFICE.

DARCY E. LEWELLEN, OF COLUMBUS, INDIANA, ASSIGNOR TO LEWELLEN MANUFACTURING COMPANY, OF COLUMBUS, INDIANA, A CORPORATION OF INDIANA.

VARIABLE-SPEED TRANSMISSION.

1,377,593.  Specification of Letters Patent.  Patented May 10, 1921.

Application filed March 18, 1920. Serial No. 366,747.

*To all whom it may concern:*

Be it known that I, DARCY E. LEWELLEN, a citizen of the United States, residing at Columbus, in the county of Bartholomew and State of Indiana, have invented certain new and useful Improvements in Variable-Speed Transmission, of which the following is a specification.

This invention relates to improvements in variable speed transmission, more particularly to the type wherein pairs of cone-shaped disks are placed on oppositely arranged shafts, one of which is driven at a constant speed and the other at varying speeds by the action of the speed varying mechanism. As is well known the disks of each set are caused to approach each other when the disks of the opposite set simultaneously diverge, changing the relative speeds of the two shafts through the action of said pairs of disks and a wedge-shaped belt operating therebetween.

In order to maintain the tension of the belt constant, regardless of the relative positions of the disks, operating levers are usually provided therefor which move on pivots and have endwise, as well as lateral motion to compensate for the change in tension of the belt which would ordinarily occur. Previously, these operating levers were formed with slots which fitted over the thrust bearings and adjusting devices used in transmissions of this type. Much difficulty was encountered by reason of the levers which are secured to the opposite disks wearing unevenly due to the manner in which they are mounted. It is one of the objects of this invention to obviate such disadvantages, and to procure a device which is simple, reliable, wears evenly, allows more ready adjustment of the disks, and a greater movement thereof in a limited space.

In carrying the objects of my invention into effect, I provide the disks, wedge-shaped belt, thrust bearings, shafts and adjusting devices, as is well known in the art, but I mount the levers constituting the operating means for the transmission mechanism with the aid of links which are secured at suitable points instead of mounting said levers directly, as was formerly done. By this arrangement I obtain smoother operation with less wear, simultaneously increase the space available for shifting of the disks, and provide additional space for a longer bearing.

Referring to the accompanying drawings forming a part hereof, and in which similar reference characters denote similar parts, Figure 1, illustrates a plan view of a transmission mechanism embodying my invention, and Fig. 2, an enlarged detail view of one of the operating levers showing the links in place.

The frame of the mechanism comprises side members 1 bolted to end members 2 the sides carrying sets of bearings 3 and 4 within which shafts 5 and 6, respectively, operate. Upon shaft 5 are secured cone-shaped disks 7 and 7' provided with thrust bearings 9 and 9'. Similarly, shaft 6 is provided with disks 8 and 8' having thrust bearings 10 and 10', respectively. A wedge-shaped belt A operates between the two sets of disks as usual.

Operating levers for adjusting the relative speeds of shafts 3 and 4 are provided, lever 11 serving to operate disks 7 and 8 and lever 12 disks 7' and 8'. The levers 11 and 12 are mounted on threaded bars 13 and 14, respectively, placed midway between shafts 5 and 6, and so formed as to allow of adjustment to compensate for wear in the belt, or to change the tension thereof. Screw member 15 placed preferably at one end of the frame is provided and serves to shift the levers and thus change the relative positions of the disks. Lever arms 16 and 17 are secured to their respective levers and are connected together by a link in order to provide the floating pivot upon which the levers operate.

The respective levers are provided with outwardly extending links 18 and 19 connected respectively to thrust bearings 10 and 10' and having pivots 20 secured to the thrust bearings and pivots 21 secured to the links. In a similar manner links 22 and 23 are provided for thrust bearings 9 and 9', respectively, having pivots 24 secured to the thrust bearings and pivots 25 to the levers. The levers are also secured to the adjusting means 15 by links 26 and 27, respectively, pivots 28 being secured to member 15 and pivots 29 to the levers. Links 30 and 31 are secured to the tension adjusting devices by pivots 32 and to the levers by pivots 33.

The operation of the device is as follows:

When the shifting mechanism 15 is rotated so as to cause the ends of levers 11 and 12 to move outwardly there will be a shifting of the cones 7 and 7' inwardly and 8 and 8' outwardly by reason of connections between the levers and the thrust bearings coöperating therewith. At the same time the levers will be shifted endwise, but owing to the pivot connections will move smoothly, and the wear induced by the shifting will be uniform due to the links and pivots. In former devices where slots were used to accommodate the endwise movement, the wear took place unevenly, and after a comparatively short time it was necessary to replace such levers.

Having thus fully described my said invention, what I claim as new and desire to secure by Letters Patent, is:

1. A variable speed transmission including a shifting lever, a shifting screw at one end of said lever, and a link for pivotally connecting the end of said lever to said shifting screw.

2. A variable speed transmission including a shifting lever, thrust bearings, and links pivotally connecting the lever to the thrust bearings.

3. In a variable speed transmission having thrust bearings, an adjusting device, a shifting lever, said lever being operatively connected to said bearings and adjusting device by a plurality of links.

4. In a variable speed transmission having thrust bearings and an adjusting device, a shifting lever, said lever being operatively connected to said bearings and adjusting device by a plurality of links, the links connected to the bearings extending outwardly.

5. In a variable speed transmission having thrust bearings and an adjusting device, a plurality of shifting levers, each of said levers being operatively connected to said bearings and adjusting device by a plurality of links, the links connected to the bearings extending outwardly.

In witness whereof, I have hereunto set my hand and seal at Indianapolis, Indiana, this 11th day of March, A. D. nineteen hundred and twenty.

DARCY E. LEWELLEN. [L. S.]

Witnesses:
H. C. BIERMAN,
M. L. SHULER.